United States Patent [19]
Gemelli

[11] Patent Number: 5,419,106
[45] Date of Patent: May 30, 1995

[54] FODDER-PROCESSING ROLLER, DEVICE AND MOWING-CONDITIONING MACHINE USING THESE ROLLERS

[75] Inventor: Villelmo Gemelli, Mantova, Italy

[73] Assignee: Kuhn, S.A., Saverne, France

[21] Appl. No.: 256,740

[22] PCT Filed: Dec. 7, 1993

[86] PCT No.: PCT/FR93/01205
§ 371 Date: Aug. 4, 1994
§ 102(e) Date: Aug. 4, 1994

[87] PCT Pub. No.: WO94/13128
PCT Pub. Date: Jun. 23, 1994

[30] Foreign Application Priority Data
Dec. 7, 1992 [IT] Italy ............... MN92A0034

[51] Int. Cl.6 ............... A01D 82/00; A01D 43/10
[52] U.S. Cl. ............... 56/16.4 B
[58] Field of Search ............... 56/1, 16.4 C, DIG. 1, 56/110, 14.1, 14.2; 241/236; 100/70 A, 155 R; 460/32

[56] References Cited
U.S. PATENT DOCUMENTS

| | | |
|---|---|---|
| 3,118,264 | 1/1964 | Barnes . |
| 3,488,929 | 1/1970 | Hale . |
| 3,513,645 | 5/1970 | Garrett et al. . |
| 3,656,284 | 4/1972 | Meek et al. . |
| 3,712,034 | 1/1973 | Praca ............... 56/16.4 C |
| 3,732,670 | 5/1973 | Milliken et al. ............... 56/16.4 C |
| 4,150,524 | 4/1979 | Sawyer ............... 56/DIG. 1 |
| 4,445,313 | 5/1984 | Elliott et al. ............... 56/16.4 C |
| 4,821,494 | 4/1989 | O'Halloran et al. . |

Primary Examiner—Stephen J. Novosad
Attorney, Agent, or Firm—Oblon, Spivak, McClelland, Maier, & Neustadt

[57] ABSTRACT

The invention concerns a fodder-processing roller. The roller according to the invention is noteworthy by virtue of the fact that each projection 17a, 17b, 17c, 17d; 18a, 18b, 18c, 18d; 19a, 19b, 19c, 19d; 20a, 20b, 20c, 20d belonging to a group of projections is joined by one of its edges to a corresponding edge of an adjacent projection belonging to the same group of projections by means of a branching element 17'a, 17'b, 17'c, 17'd; 18'a, 18'b, 18'c, 18'd; 19'a, 19'b, 19'c, 19'd; 20'a, 20'b, 20'c, 20'd having a reduced cross-section, so that all of the projections 17a, 17b, 17c, 17d; 18a, 18b, 18c, 18d; 19a, 19b, 19c, 19d; 20a, 20b, 20c, 20d and branching elements 17'a, 17'b, 17'c, 17'd; 18'a, 18'b, 18'c, 18'd; 19'a, 19'b, 19'c, 19'd; 20'a, 20'b, 20'c, 20'd belonging to the same group of projections form a rib 17, 18, 19, 20 which is arranged continuously along the roller. The invention also concerns a fodder-processing device and a mowing-processing machine using these fodder-processing rollers.

25 Claims, 4 Drawing Sheets

FODDER-PROCESSING ROLLER, DEVICE AND MOWING-CONDITIONING MACHINE USING THESE ROLLERS

The present invention concerns a fodder-processing roller designed to be incorporated into a device for processing fodder by folding it and comprising two at least approximately parallel rollers each rotating around its longitudinal axis, in order to cause the fodder to be processed to travel between them, the projections on one of the rollers engaging with the projections on the other roller.

Conventional practice calls for causing fodder plants to travel between two processing rollers in order to bend the stalks of said plants, so as to accelerate the elimination of water contained therein. To this end, said rollers incorporate ribs, generally helical-shaped, which engage with each other when the rollers rotate and which are designed to produce tears in the plant stalks through which the water can more rapidly evaporate, while the leaves of these fodder plants remain intact as they pass between these rollers.

One disadvantage of these conventional rollers lies in the fact that the stalks of the fodder plants to be processed may be project between the two rollers in directions approximating the direction of the helical formed by the ribs. Accordingly, these stalks undergo minimal bending and may even not be bent at all, passing untreated or virtually untreated through the rollers.

This problem becomes very appreciable when using mowing-processing machines incorporating discs (disc-mower conditioners), which discs feed the processing rollers in a relatively random fashion.

Attempts have previously been made to solve this problem.

One solution is described in the German application No. 20 55 244. The processing roller as shown in FIGS. 3 and 4 of this document comprises a cylindrical core and four groups of projections uniformly spaced along the periphery of the roller. Each projection has at least approximately the shape of a polyhedron whose section is at least approximately a quadrilateral, and, more precisely, a diamond whose sides are inclined in relation to the longitudinal axis of the roller. Each group of projections is arranged along a generating line along the cylindrical core. Within each group, the projections are spaced apart and the inclined sides of each projection extend within the extension of the inclined sides of the adjacent projections.

While this configuration improves processing to some degree, it should nevertheless be noted that the stalks which appear at the level of the spaces between the projections also remain unbent.

There is even a strong probability that the stalks that have penetrated into the spaces between the projections cannot be extricated therefrom, thereby unavoidably producing an unacceptable packing of the rollers.

Moreover, these conventional rollers cannot mesh under good conditions.

The purpose of the invention lies in solving this problem.

This purpose was achieved in a completely surprising way by using a fodder-processing roller comprising a core and groups of projections arranged along the roller, each projection having at least approximately the shape of a polyhedron whose sides are inclined in relation to the longitudinal axis of the roller, wherein each projection belonging to a group of projections is joined by one of its edges to a corresponding edge of an adjacent projection belonging to the same group of projections by means of a branching element having a reduced section, so that all of the projections and branching elements belonging to the same group of projections form a rib which is arranged continuously along the roller.

This roller is designed to equip a fodder-processing device operating by folding the fodder and comprising two rollers at least approximately parallel to each other, each of which rotates around its longitudinal axis so as to cause the fodder to be processed to travel between them, the projections of one of the rollers meshing with the projections of the other roller.

By virtue of this feature, each stalk is bent many times, whatever the direction in which the stalk penetrates between the two rollers. Moreover, any risk of packing of the rollers is eliminated.

According to an additional invention feature, each projection has at least approximately the shape of a polyhedron whose section has at least approximately the shape of a quadrilateral.

Advantageously, each projection is at least approximately prism-shaped.

According to another feature of the invention, one inclined side of a projection of a rib lies at least approximately within the extension of an inclined side of an adjacent projection on the same rib, or it is slightly offset and at least approximately parallel to this inclined side.

According to a further invention feature, one diagonal of the projections extends at least approximately within a plane orthogonal to the longitudinal axis of the roller.

Advantageously, the diagonals of the corresponding projections of the ribs of a roller extend at least approximately within the same plane orthogonal to the longitudinal axis of the roller.

In another advantageous arrangement, diagonals of the projections extending in planes orthogonal to the longitudinal axis of the roller have at least approximately the same length.

According to yet another invention feature, the free edges of each projection are bevelled, and, advantageously, this bevel is rounded.

According to an additional feature of the invention, the branching elements have a shape similar to and complementary with the shape of the free edges of the projections.

According to another invention feature, the solid parts/empty spaces ratio of one of the end sections of the roller is at least approximately equal to the empty spaces/solid parts ratio of the other end section of the roller.

According to a further invention feature, each rib is arranged along the roller by being wound at least partially around the core.

Advantageously, the median lines of a certain number of adjacent projections of a rib passing through the branching elements form at least approximately a spiral or a helix shape.

According to an important additional invention feature, each rib is arranged along the roller by describing an undulated curve.

Advantageously, the undulations of this undulated curve formed by the median lines of the projections on a rib passing through the branching elements are at least approximately portions of a spiral or a helix.

Preferably, the median line of one projection positioned at the tip of an undulation is formed at least approximately by a portion of a spiral or a helix and by a portion of a generating line at least approximately parallel to the longitudinal axis of the roller.

Preferably also, the undulated curve is at least approximately symmetrical in relation to a median plane orthogonal to the longitudinal axis of the roller, and the solid parts/empty spaces ratio of one of the end sections of the roller is at least approximately equal to the empty spaces/solid parts ratio of the other end section of the roller. In this way, it is possible to use the same mold to produce two rollers designed to equip a fodder-processing device, while at the same time guaranteeing continuous meshing thereof.

According to an additional invention feature, the roller is made of a series of identical modules, and the solid parts/empty spaces ratio of one of the end sections of one module is at least approximately equal to the empty spaces/solid parts ratio of the other end section of the module.

In accordance with a further characteristic of the invention, the portion of the undulated curve of reach rib of a module is at least approximately symmetrical in relation to a median plane orthogonal to the longitudinal axis of the module.

According to another invention characteristic, one of the end sections of the module is positioned at the level of the diagonal of a projection extending at least approximately in a plane orthogonal to the longitudinal axis of the module, and the other end section of the module is positioned at the level of a branching element.

According to an addition invention feature, the core is at least approximately cylindrical.

The invention also relates to a fodder-processing device which operates by bending the fodder, comprising two rollers at least approximately parallel to each other, each of which rotates around its longitudinal axis so as to cause the fodder to be processed to travel between them, the projections of one of the rollers meshing with the projections of the other roller, this device being characterized by the fact that it incorporates rollers according to the invention.

In this processing device, advantage will be gained by specifying that the clearances between the rib of one of the rollers and the corresponding ribs of the other roller be at a maximum at the level of the branching elements.

Finally, the invention concerns a mowing-processing machine (mower-conditioner) comprising a mowing device and a device for processing the fodder cut by the mowing device, this mowing-processing machine comprising a processing device according to the invention.

The invention will be understood by means of the following description of a non-restrictive embodiment, provided with reference to the attached drawings in which.

Figure 1:
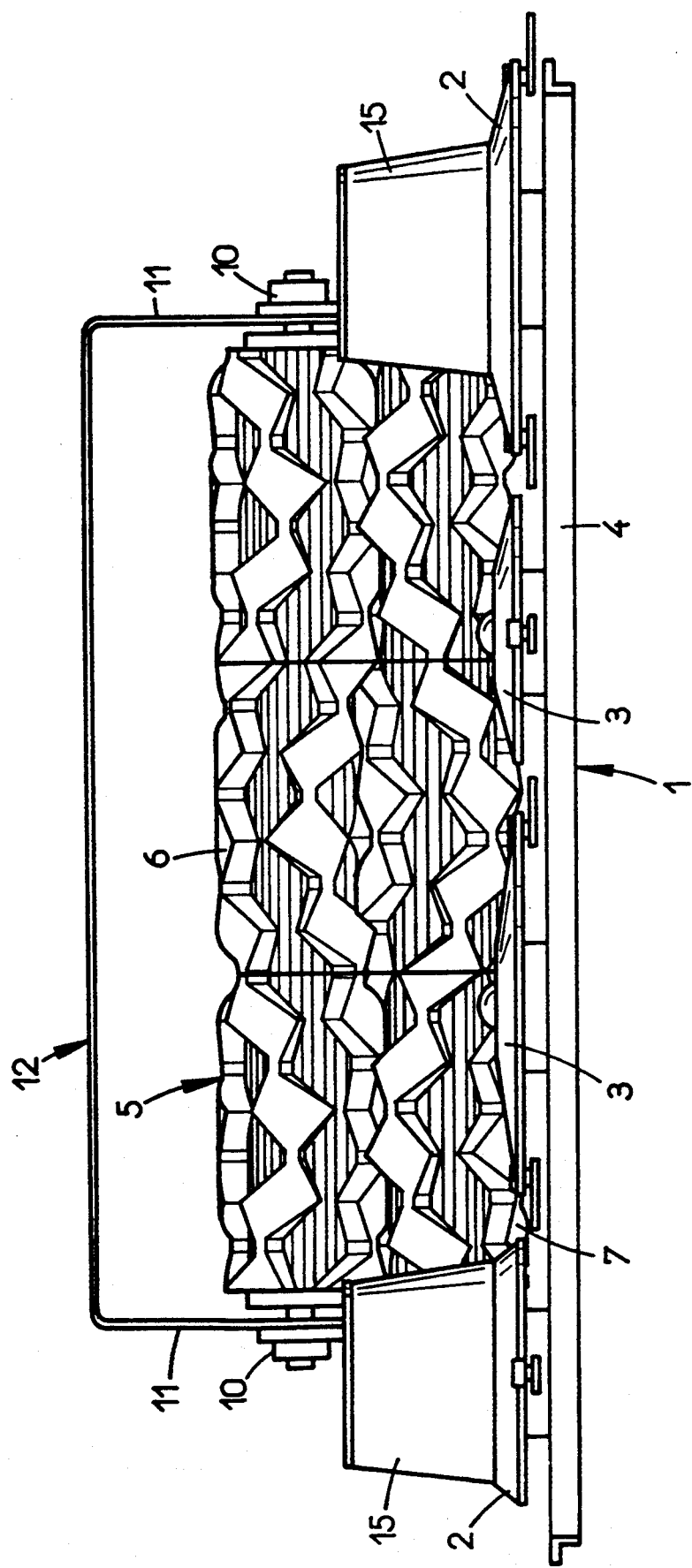
FIG. 1 is a front view of a mowing-processing machine equipped with a fodder-processing device operating by bending the fodder, comprising two fodder-processing rollers according to the invention.

FIG. 1 illustrates a mowing-processing machine comprising a mowing device 1 fitted, in non-limiting fashion, with four cutting elements 2, 3. In the example illustrated, these cutting elements 2, 3 are guided in rotation on the upper surface of a housing 4 and rotate around upwardly directed axes. These cutting elements 2, 3 extend transversely to the direction in which work proceeds.

A fodder-processing device 5 operating by bending the fodder extends behind the mowing device 1. This fodder-processing device 5 comprises two fodder-conditioning rollers 6, 7 arranged at least approximately parallel and rotating in opposite directions according to the arrows 8, 9, so that the fodder cut by the cutting elements 2, 3 travels between these rollers 6, 7. The rollers 6, 7 are conventionally guided in rotation in bearings 10 fitted on the lateral walls 11 of a casing 12. These lateral walls 11 extend at least approximately vertically and at least approximately in the direction of operation; i.e., in the example shown, at least approximately orthogonally to the longitudinal axis 13, 14 of the rollers 6, 7. FIG. 1 further shows that each lateral wall 11 extends behind a rotor 15 positioned above the corresponding cutting element 2 arranged at each end of the mowing device 1.

Each roller 6, 7 comprises a core 16 at least substantially cylindrical in shape and ribs 17, 18, 19, 20. Each of these ribs 17, 18, 19, 20 is formed by a group of projections 17a, 17b, 17c, 17d; 18a, 18b, 18c, 18d; 19a, 19b, 19c, 19d; 20a, 20b, 20c, 20d joined by branching elements 17'a, 17'b, 17'c, 17'd; 18'a, 18'b, 18'c, 18'd; 19'a, 19'b, 19'c, 19'd; 20'a, 20'b, 20'c, 20'd incorporating smaller sections. Each rib thus formed is arranged continuously along its respective roller. It may, of course, comprise a number of projections different from that in the example shown.

Each projection 17a 17b 17c 17d; 18a, 18b, 18c, 18d; 19a, 19b, 19c, 19d; 20a, 20b, 20c, 20d has at least approximately the shape of a polyhedron whose section is at least approximately, quadrilateral in shape and has sides $\alpha, \beta, \delta, \epsilon$, which are inclined in relation to the longitudinal axis 13, 14 of the corresponding roller 6, 7. This shape approximates a polyhedron, since the two bases exhibit a degree of curvature. In the example illustrated, said projections 17a, 17b, 17c, 17d; 18a, 18b, 18c, 18d; 19a, 19b, 19c, 19d; 20a, 20b, 20c, 20d even have approximately the shape of a prism, the base at the level of the core 16 being somewhat smaller than the outer base.

Each projection 17a, 17b, 17c, 17d; 18a, 18b, 18c, 18d; 19a, 19b, 19c, 19d; 20a, 20b, 20c, 20d is joined at the location of its edge formed by the inclined sides $\alpha, \beta$ and $\delta, \epsilon$ respectively, to the edge formed by the inclined sides $\delta, \epsilon$ and $\alpha, \beta$, respectively, of an adjacent projection by means of the corresponding branching element 17'a, 17'b, 17'c, 17'd; 18'a, 18'b, 18'c, 18'd; 19'a, 19'b, 19'c, 19'd; 20'a, 20'b, 20'c, 20'd. Moreover, one inclined side $\alpha, \beta, \delta, \epsilon$ of a projection 17a, 17b, 17c, 17d; 18a, 18b, 18c, 18d; 19a, 19b, 19c, 19d; 20a, 20b, 20c, 20d belonging to a rib 17, 18, 19, 20 extends at least approximately within the extension of an inclined side $\delta, \epsilon, \alpha, \beta$ of an adjacent projection belonging to the same rib, or else is slightly offset and at least approximately parallel to that side (see FIG. 4). It emerges that the diagonal 21a, 21b, 21c, 21d joining the free edge 22a, 22b, 22c, 22d of a projection 17a, 17b, 17c, 17d; 18a, 18b, 18c, 18d; 19a, 19b, 19c, 19d; 20a, 20b, 20c, 20d to the free edge 23a, 23b, 23c, 23d of said projection extends at least approximately in a plane orthogonal to the longitudinal axis 13, 14 of the corresponding roller 6, 7. In addition, the corresponding diagonals 21a, 21b, 21c, 21d of the projections 17a, 17b, 17c, 17d; 18a, 18b, 18c, 18d; 19a, 19b, 19c, 19d; 20a, 20b, 20c, 20d of the ribs 17, 18, 19, 20 of a roller 6, 7 extend at least approximately in the same plane orthogonal to the longitudinal axis 13, 14 of the roller 6, 7. The branching elements 17'a, 17'b, 17'c, 17'd; 18'a, 18'b, 18'c, 18'd; 19'a, 19'b, 19'c, 19'd; 20'a, 20'b, 20'c, 20'd are similarly arranged. Moreover, the diagonals 21a, 21b, 21c, 21d of the different projections 17a, 17b, 17c, 17d; 18a, 18b, 18c, 18d; 19a, 19b, 19c, 19d; 20a, 20b, 20c, 20d have at least approximately the same length.

In addition, the free edges 22a, 23a; 22b, 23b; 22c, 23c; 22d, 23d of the projections 17a, 17b, 17c, 17d; 18a, 18b, 18c, 18d; 19a, 19b, 19c, 19d; 20a, 20b, 20c, 20d incorporate a bevel formed in the example illustrated by a rounded portion. The branching elements 17'a, 17'b, 17'c, 17'd; 18'a, 18'b, 18'c, 18'd; 19'a, 19'b, 19'c, 19'd; 20'a, 20'b, 20'c, 20'd have a similar shape which matches the shape of said free edges 22a, 23a; 22b, 23b; 22c, 23c; 22d, 23d); that is, in the example shown the branching elements 17'a, 17'b, 17'c, 17'd; 18'a, 18'b, 18'c, 18'd; 19'a, 19'b, 19'c, 19'd; 20'a, 20'b, 20'c, 20'd also incorporate a rounded portion.

Each rib 17, 18, 19, 20 is arranged along the roller 6, 7 along an undulated curve 24 formed by the median lines 25a, 25b, 25c, 25d of the projections 17a, 17b, 17c, 17d; 18a, 18b, 18c, 18d; 19a, 19b, 19c, 19d; 20a, 20b, 20c, 20d. The median lines 25a, 25b, 25d are at least approximately portions of a spiral or a helix. The median line 25c of the projection 17c, 18c, 19c, 20c positioned at the tip 26 of an undulation is formed at least approximately by a portion of a spiral or a helix 27 and a portion of a generating line 28 at least approximately parallel to the longitudinal axis 13, 14 of the roller 6, 7. The spiral or helix portion 27 constitutes, moreover, at least approximately the continuous extension of the median line 25d.

Figure 4:
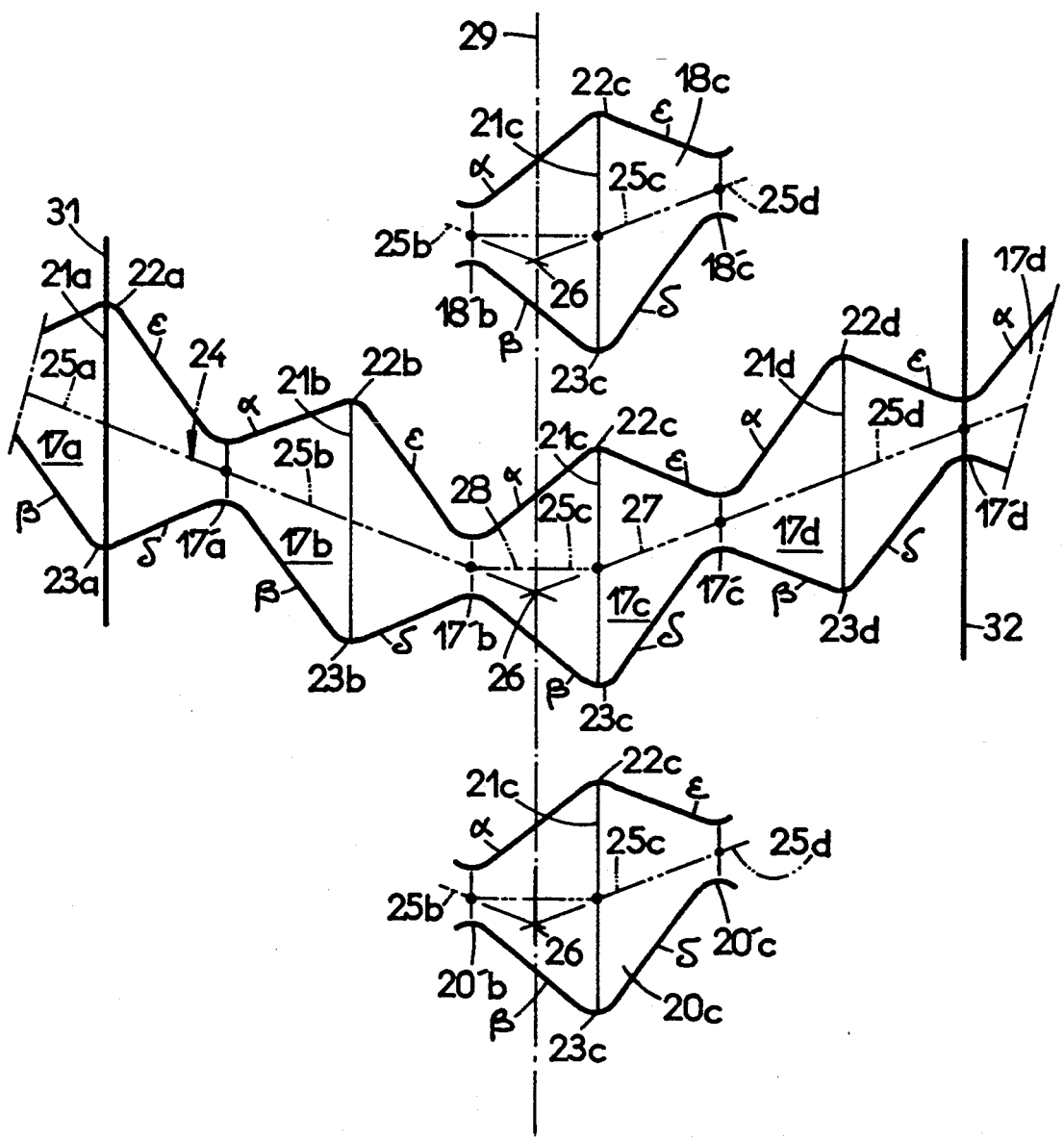
FIG. 4 illustrates a development of a rib belonging to a module.

FIG. 4 shows that an undulation is at least approximately symmetrical in relation to a median plane 29 passing through the tip 26 and orthogonal to the longitudinal axis 13, 14 of the roller 6, 7.

Figure 5:
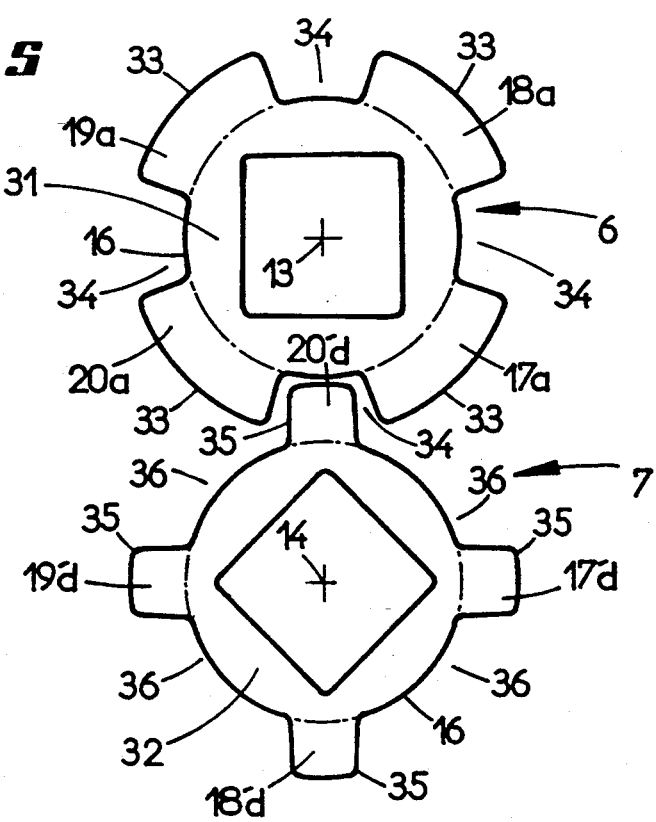
FIG. 5 is a view as seen from the direction of the arrow V in FIG. 3.
Figure 3:
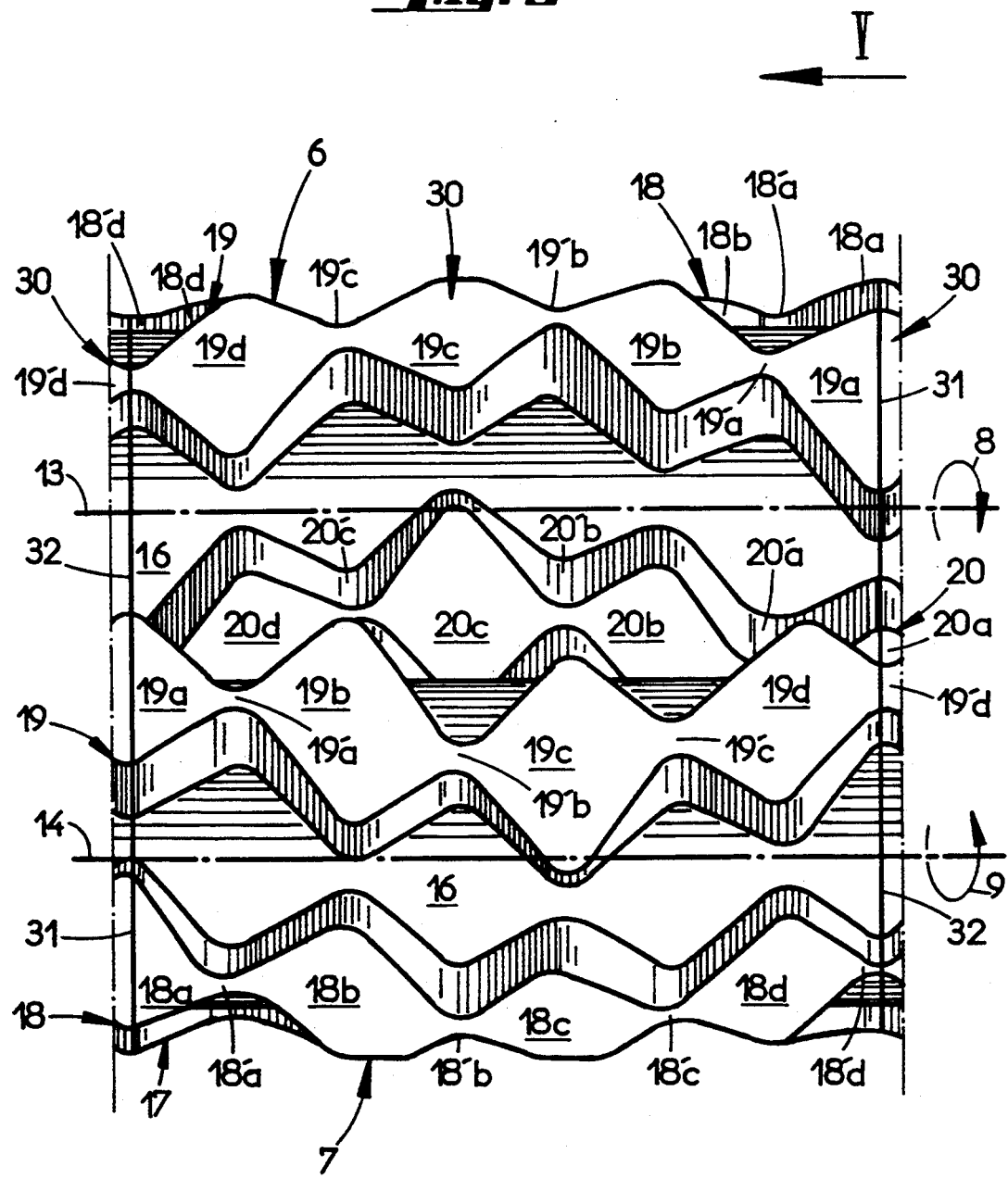
FIG. 3 illustrates two modules according to FIG. 2 in the engaged position.

In the example shown, each of the rollers 6, 7 is composed of a series of identical modules 30. Each module 30 comprises two end sections 31, 32. The end section 31 extends at the level of the diagonals 21a of the projections 17a, 18a, 19a, 20a, and the end section 32 extends at the level of the branching elements 17'd, 18'd, 19'd, 20'd. FIG. 5 shows that the portion of the end section 31 extending beyond the core 16 comprises solid parts 33 formed by the material used to produce the projections 17a, 18a, 19a, 20a and interspersed with empty spaces 34. The portion of the end section 32 extending beyond the core 16 incorporates solid parts 35 made of the material used to produce the branching elements 17'd, 18'd, 19'd, 20'd and interspersed with empty spaces 36. This configuration is such that the ratio of solid parts 33 to empty spaces 34 in the end section 31 is at least approximately equal to the ratio of empty spaces 36 to solid parts 35 in the end section 32, while excepting the clearances between the solid parts 33, 35 and the empty spaces 34, 36.

Because these ratios are equal and because of the fact that the undulations along which the ribs 17, 18, 19, 20 are arranged are at least approximately symmetrical in relation to the median plane 29 passing though the tips 26 of the different undulations, the different identical modules 30 can be used to produce both counterrotating rollers 6, 7, while enabling the ribs 17, 18, 19, 20 of the roller 6 to mesh with the ribs 17, 18, 19, 20 of the roller 7. Moreover, a relatively uniform drive force is generated.

In addition, the projections 17a, 17b, 17c, 17d; 18a, 18b, 18c, 18d; 19a, 19b, 19c, 19d; 20a, 20b, 20c, 20d and the branching elements 17'a, 17'b, 17'c, 17'd; 18'a, 18'b, 18'c, 18'd; 19'a, 19'b, 19'c, 19'd; 20'a, 20'b, 20'c, 20'd belonging to the different ribs 17, 18, 19, 20 and the spaces between two successive ribs 17, 18, 19, 20 are sized in such a way that the clearances between one rib 17, 18, 19, 20 on one of the rollers 6,7 and the two corresponding ribs 17, 18, 19, 20 on the other roller 14 are at their maximum at the level of the branching elements 17'a, 17'b, 17'c, 17'd; 18'a, 18'b, 18'c, 18'd; 19'a, 19'b, 19'c, 19'd; 20'a, 20'b, 20'c, 20'd. It is important, moreover, that the clearance at the level of a branching element 17'a, 17'b, 17'c, 17'd; 18'a, 18'b, 18'c, 18'd; 19'a, 19'b, 19'c, 19'd; 20'a, 20'b, 20'c, 20'd be sizable, so as to avoid cutting the stalks which travel across that location.

When in operation, the cutting elements 2, 3 belonging to the mowing device of the mowing-processing machine are conventionally driven in rotation. By moving the mowing-processing machine, said cutting elements 2, 3 cut the fodder in front of them and throw the cut fodder backward. This fodder is then caught by the two processing rollers 6, 7, which are driven in counterrotation in conventional fashion, i.e., mechanically, hydraulically, etc. The fodder stalks travelling between the two rollers are bent, and it will be understood that the maximum distance between two successive bends is at least approximately equal to the length of the diagonals 21a, 21b, 21c, 21d of the projections 17a, 17b, 17c, 17d; 18a, 18b, 18c, 18d; 19a, 19b, 19c, 19d; 20a, 20b, 20c, 20d, while the minimum distance between two successive bends will be obtained at the branching elements 17'a, 17'b, 17'c, 17'd; 18'a, 18'b, 18'c, 18'd; 19'a, 19'b, 19'c, 19'd; 20'a, 20'b, 20'c, 20'd.

Figure 2:
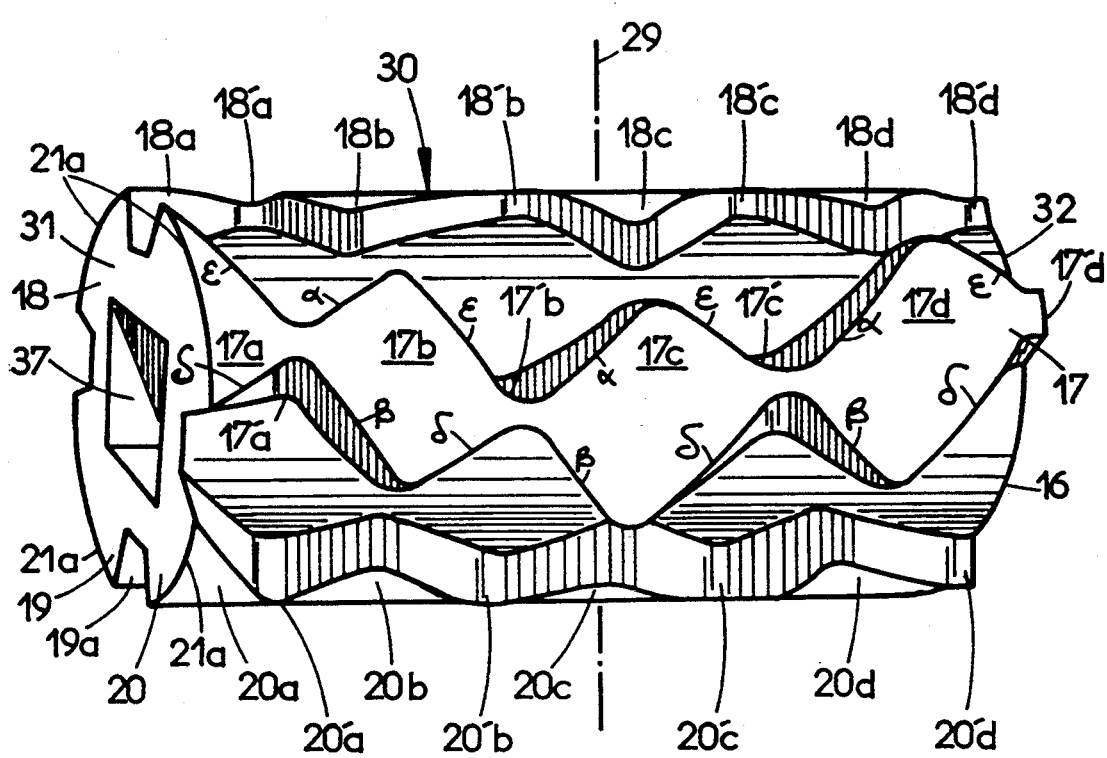
FIG. 2 illustrates a module belonging to a fodder-processing roller according to the invention.

FIG. 2 illustrates that each module 30 comprises a central hole 37 centered on the longitudinal axis of the module 30 and having a non-circular cross-section (squared in the example shown). This central hole 37 extends completely through the module, so that each of the modules 30 belonging to a roller 6, 7 can be fitted on a bar (not shown), which is generally metal and whose cross-section matches the section of the central holes 37, in order to prevent the modules 30 from rotating on the bar.

It will be understood that, within the scope of the invention, each roller 6, 7 can also be produced in one piece.

In this case, provision may equally well be made for fitting the roller on a bar or for forming the ribs 17, 18, 19, 20 directly around a central metal tube, for example by vulcanization, if the ribs 17, 18, 19, 20 are to be made of rubber. Other substances can, however, be used, i.e., polyurethane.

In this case too, the rollers 6, 7 can also be identical, provided the same requirements as those described for a module 30 are met, i.e.:

equality between the solid parts/empty spaces ratio of an end section and the empty spaces/solid parts ratio of the other end section, and symmetry of the undulated curve 24 in relation to the median plane orthogonal to the longitudinal axis 13, 14 of the roller 6, 7.

In the example described each roller 6, 7 is equipped with our ribs 17, 18, 19, 20. It will be understood, however, that the number of ribs may differ, e.g., five or six.

It will also be understood that the undulated curve 24 could be replaced by a chevron curve whose tip is positioned in the median plane orthogonal to the longitudinal axis of the roller.

It will also be understood that the cutting elements belonging to the mowing device described may be of another type.

The processing device could even be used separately, without being combined with a mowing device.

Finally, various other modifications can be made in the embodiment described, while still remaining within the overall framework of the present invention as specified in the following claims.

I claim:

1. Fodder-processing roller comprising a core and groups of projections arranged along said roller, each projection having at least approximately the shape of a polyhedron whose sides are inclined in relation to the longitudinal axis of the roller, said roller being designed to equip a fodder-processing device operating by bending the fodder and comprising two rollers at least approximately parallel to each other, each of which rotates around its longitudinal axis so as to cause the fodder to be processed to travel between them, the projections of one of the rollers meshing with the projections of the other roller, wherein each projection belonging to a group of projections is joined by one of its edges to a corresponding edge of an adjacent projection belonging to the same group of projections by means of a branching element having a reduced cross-section, so that all of the projections and branching elements belonging to the same group of projections form a rib which is arranged continuously along the roller.

2. Fodder-processing roller according to claim 1, wherein each projection has at least approximately the shape of a polyhedron whose section is at least approximately a quadrilateral.

3. Fodder-processing roller according to claim 1, wherein each projection has at least approximately the shape of a prism.

4. Fodder-processing roller according to claim 1, wherein one inclined side of a projection of a rib lies at least approximately within the extension of an inclined side of an adjacent projection on the same rib, or is slightly offset and at least approximately parallel to said side.

5. Fodder-processing roller according to claim 1, wherein one diagonal of the projections extends at least approximately in a plane orthogonal to the longitudinal axis of the roller.

6. Fodder-processing roller according to claim 5, wherein the diagonals of the corresponding projections of the ribs of the roller extend at least approximately in the same plane orthogonal to the longitudinal axis of the roller.

7. Fodder-conditioning roller according to claim 5, wherein the diagonals of the projections extending in planes orthogonal to the longitudinal axis of the roller have at least approximately the same length.

8. Fodder-processing roller according to claim 1, wherein the free edges of each projection incorporate a bevel.

9. Fodder-processing roller according to claim 8, wherein said bevel is rounded.

10. Fodder-processing roller according to claim 1, wherein said branching elements are of a shape similar to and complementary with the shape of the free edges of the projections.

11. Fodder-processing roller according to claim 1, wherein the solid parts/empty spaces ratio of one of the end sections of the roller is at least approximately equal to the empty spaces/solid parts ratio of the other end section of the roller.

12. Fodder-processing roller according to claim 1, wherein each rib is arranged along said roller by being wound at least partially around said core.

13. Fodder-processing roller according to claim 12, wherein the median lines of a certain number of adjacent projections of a rib passing through the branching elements form at least approximately a spiral or a helix shape.

14. Fodder-processing roller according to claim 12, wherein each rib is arranged along the roller in an undulated curve.

15. Fodder-processing roller according to claim 14, wherein the undulations of the undulated curve formed by the median lines of the projections belonging to a rib passing through the branching elements are at least approximately portions of a spiral or a helix.

16. Fodder-processing roller according to claim 15, wherein the median line of a projection positioned at the tip of an undulation is formed at least approximately by a portion of a spiral or a helix and a portion of a generating line at least approximately parallel to the longitudinal axis of the roller.

17. Fodder-processing roller according to claim 14, wherein said undulated curve is at least approximately symmetrical in relation to a median plane orthogonal to the longitudinal axis of the roller, and the solid parts/empty spaces ratio of one of the end sections of the roller is at least approximately equal to the empty spaces/solid parts ratio of the other end section of the roller.

18. Fodder-processing roller according to claim 1, wherein said roller is made from a series of identical modules, and the solid parts/empty spaces ratio of one of the end sections of a module is at least approximately equal to the empty spaces/solid parts ratio of the other end section of the module.

19. Fodder-processing roller according to claim 18 or claim 14, wherein the position of the undulated curve of each rib of a module is at least approximately symmetrical in relation to a median plane orthogonal to the longitudinal axis of the module.

20. Fodder-processing roller according to claim 18, wherein one of the end sections of said module is arranged at the level of the diagonal of a projection extending at least approximately in a plane orthogonal to the longitudinal axis of the module, and the other end section of the module is arranged at the level of a branching element.

21. Fodder-processing roller according to claim 1, wherein the core is at least approximately cylindrical.

22. Fodder-processing device operating by bending the fodder, comprising two rollers at least approximately parallel to each other, each of which rotates around its longitudinal axis so as to cause the fodder to be processed to travel between them, the projections of one of the rollers engaging with the projections of the other roller, wherein said rollers are rollers according to any of claims 1 to 21.

23. Fodder-processing device operating by bending the fodder, comprising two rollers at least approximately parallel to each other, each of which rotates around its longitudinal axis so as to cause the fodder to be processed to travel between them, the projections of one of the rollers engaging with the projections of the other roller, wherein:
   i) said rollers are rollers according to any of claims 1 to 21; and
   ii) the clearances between the rib of one of the rollers and the corresponding ribs of the other roller are at a maximum at the level of the branching elements.

24. Mowing-processing machine comprising a mowing device and a fodder-processing device for treating the fodder cut by the mowing device, said fodder-processing device which operates by bending the fodder, comprising two rollers at least approximately parallel to each other, each of which rotates around its longitudinal axis so as to cause the fodder to be processed to travel between them, the projections of one of the rollers engaging with the projections of the other roller, wherein said rollers are rollers according to any of claims 1 to 21.

25. Mowing-processing machine comprising a mowing device and a fodder-processing device for treating the fodder cut by the mowing device, said fodder-processing device which operates by bending the fodder, comprising two rollers at least approximately parallel to each other, each of which rotates around its longitudinal axis so as to cause the fodder to be processed to travel between them, the projections of one of the rollers engaging with the projections of the other roller, wherein:
   i) said rollers are rollers according to any of claims 1 to 21; and
   ii) the clearances between the rib of one of the rollers and the corresponding ribs of the other roller are at a maximum at the level of the branching elements.

* * * * *